Dec. 24, 1968    HISAO FUTAKI    3,418,648
TEMPERATURE DETECTOR
Filed March 9, 1967    6 Sheets-Sheet 1

INVENTOR
HISAO FUTAKI
BY
H. Edward Mestern

United States Patent Office 3,418,648
Patented Dec. 24, 1968

3,418,648
TEMPERATURE DETECTOR
Hisao Futaki, Musashino-shi, Tokyo-to, Japan, assignor to Kabushiki Kaisha Hitachi Seisakusho, Tokyo-to, Japan, a joint-stock company of Japan
Continuation-in-part of application Ser. No. 355,250, Mar. 27, 1964. This application Mar. 9, 1967, Ser. No. 621,848
17 Claims. (Cl. 340—228)

ABSTRACT OF THE DISCLOSURE

Temperature detector using as its sensor a critical temperature resistor fabricated by oxide semiconductor comprising fine grains of $VO_2$ (or $V_2O_4$) crystal. The resistor has a low resistance-temperature coefficient within a range below a certain definite temperature and an extremely large negative resistance-temperature coefficient to appear when the temperature exceeds the abovementioned definite temperature. A highly stable and sensitive detector is obtainable by using such critical temperature resistor as its sensor, for the definite temperature is equal to or near the desired detecting temperature or set operation temperature.

---

This application is a continuation-in-part of a prior application U.S. Ser. No. 355,250 filed Mar. 27, 1964, in the name of Hisao Futaki, entitled "Temperature Detector," and now abandoned.

This invention relates to a temperature detecting device and more particularly to a new temperature detector having desirable characteristics, in which a unique oxide semiconductor is used.

In my application Ser. No. 484,510, filed Aug. 24, 1965 and now abandoned, as a continuation-in-part of my earlier application Ser. No. 266,235, filed Mar. 19, 1963 and now abandoned, a unique resistor has been disclosed. The resistor possesses an extremely large negative resistance-temperature coefficient within a given specific range and a small resistance temperature coefficient just below and above said range, the resistance value of which decreases abrupt'y and stepwise with a temperature increase in excess of the upper limit of the temperature range, wherein an extremely large resistance-temperature coefficient prevails (i.e. while the temperature rises by about 10° C., its resistance value decreases by about $\frac{1}{10^2}$–$\frac{1}{10^4}$). Such resistor will hereinafter be referred to by the tentative nomenclature as a "critical temperature resistor."

This critical temperature resistor is composed of an oxide semiconductor which is obtained by reduction of mixtures of vanadium pentoxide and other oxides in a reducing atmosphere and of simultaneous or subsequent sintering of the reduced oxide mixes. For the abovementioned other oxides, oxides of phosphorus (P), silver (Ag), lithium (Li), sodium (Na), potassium (K), beryllium (Be), magnesium (Mg), calcium (Ca), lanthanum (La), cerium (Ce), zirconium (Zr), zinc (Zn), cadmium (Cd), boron (B), aluminum (Al), silicon (Si), tin (Sn), bismuth (Bi), uranium (U), and yttrium (Y) can be used singly or in mixture. When the abovementioned oxide semiconductor is observed through an electron microscope, it is seen that fine crystals of $VO_2$ (or $V_2O_4$) deposited in the course of the abovementioned reduction and sinter-treatment scatter in the sintered body of the mixture of vanadium pentoxide ($V_2O_5$) and other oxides in a state of being surrounded by them. The abrupt change in the resistance value of this critical temperature resistor is caused by the fine crystals of $VO_2$, and, in order to obtain a favorable temperature-resistance characteristics, the fine crystals of $VO_2$ may preferably be contained to more than 5 mol percent in the above mentioned oxide semiconductor. In case the $VO_2$ content is less than 5 mol percent, the degree of variation in the resistance value becomes small. Consequently, in the abovementioned reduction-treatment, it is necessary to continue reduction until such time that said vanadium pentoxide is converted to a sufficient quanty of $V_2O_4$. It should also be taken care that when the fine crystal of the abovementioned $VO_2$ is too large in size, a hysteresis phenomenon (a phenomenon wherein the locus of variation in the resistance value when the temperature is gradually increased and that when the temperature is caused to decrease do not coincide) would inevitably appear in the temperature-resistance characteristics, and, moreover, the characteristics will become gradually deteriorated as the critical temperature resistor is used repeatedly. In this sense, the $VO_2$ crystal should be controlled to as small a size as possible, or, preferably less than a few tens of microns. In order to obtain such fine crystal in the aforementioned manner, the best way contemplated is to abruptly cool the oxide semiconductor while it is being kept heated after sintering.

During the process of reduction or sintering, vanadium pentoxide $V_2O_5$ and the aforementioned other oxides to be mixed with $V_2O_5$ are melted by heat, and fine crystals of $VO_2$ are deposited out of the melt of the mixture. The heating temperature at this time should be lower than the melting point of $VO_2$ (or $V_2O_4$). After the cooling, the mixture is to surround the fine crystals of $VO_2$, further connects the crystals mutually and electrically and, at the same time, functions to prevent the electrical characteristics of $VO_2$ from being varied with lapse of time under influence of external atmosphere. It has heretofore been known that a single crystal of $VO_2$ undergoes abrupt change in its resistance value within a certain specific temperature range, the same as a thermistor having the aforementioned composition. However, this element consisting of single crystal of $VO_2$ is disadvantageous in that deterioration in its electrical characteristics with lapse of time is enormous because vanadium dioxide directly contacts air to change its characteristics and, moreover, the size of the crystals is large with the consequent emergence of hysteresis phenomena. On account of these facts, $VO_2$ monocrystal has not become practically useful.

The temperature range, in which the resistance value of the abovementioned oxide semiconductor varies abruptly is from 60° C. to 75° C., and the principal range of the abrupt change is between 65° C. and 70° C., theoretically, this abrupt change takes place at 67.5° C. An oxide semiconductor containing as its principal constituent vanadium oxide whose temperature range for its abrupt change is lower than 60° C. or higher than 75° C. has been disclosed in my copending application Ser. No. 475,-129, filed July 27, 1965. According to this application, at least one of the elements such as germanium (Ge), iron (Fe), cobalt (Co), nickel (Ni), manganese (Mn), titanium (Ti), niobium (Nb), tungsten (W), molybdenum (Md), tantalum (Ta), and chromium (Cr) is disposed or introduced in the state of solid solution in the fine crystals of $VO_2$. This latter oxide semiconductor is obtained by first mixing the aforementioned other oxides or the oxides of the abovementioned elements in place thereof with vanadium pentoxide ($V_2O_5$), heat-treating this mixture in a reducing atmosphere at a temperature which is higher than the melting (or softening) point of the mixture, but is lower than the melting point of the $VO_2$ crystals, and depositing fine crystals of $VO_2$ from the melt of this mixture of $V_2O_5$ and the abovementioned oxides. A small quantity of the abovementioned metal element is dispersed or introduced in the fine crystals of $VO_2$. In case Ti and/or Ge are contained in the $VO_2$ fine crystals, the temperature range within which the resistance value changes abruptly becomes higher than that when these elements are not present. On the other hand, when Fe, Co, Ni, Mn, Nb, W, Md, Cr and/or Ta is contained in the $VO_2$ fine crystals, the abovementioned temperature range becomes lower than that in the case of their being not present. As stated in the foregoing, the critical temperature thermistor containing the abovementioned fine crystals of $VO_2$ possesses a characteristic such that its resistance value decreases abruptly with increase in temperature within a certain definite temperature range. This thermistor further indicates peculiar change in the current-voltage characteristics which can not be seen in the conventional thermistor. That is, when the ambient temperature is kept constant, the degree of variation in voltage appearing across the terminals of the thermistor with respect to variation in current flowing in the thermistor becomes remarkably large, and the abovementioned voltage value attains its maximum at a certain specific current value. The maximum value of this voltage decreases with increase in the ambient temperature, in which case the rate of decrease in the maximum voltage value with respect to variation in the ambient temperature is great; particularly, the value is subjected to remarkable variation with respect to variation in the ambient temperature corresponding to the temperature range within which the abovementioned resistance value changes abruptly. Such electrical characteristics could not be expected from the conventional thermistor, wherein the resistance value changes only exponentially with respect to temperature variation.

The present invention intends to apply the abovementioned critical temperature thermistor as a sensor for temperature detector in utilizing the characteristics the thermistor possesses such that (1) it has extremely large negative resistance-temperature coefficient with a specific temperature range and, in the course of this range, the resistance value thereof abruptly decreases with rise in temperature; (2) it has extremely small resistance-temperature coefficient at normal temperature or at a temperature lower than the abovementioned temperature range, hence variation in resistance value with respect to variation in temperature is extremely small at that specific temperature; (3) it has large variation in the maximum voltage value with respect to temperature, the variation being particularly remarkable with respect to variation in the ambient temperature corresponding to the abovementioned specific temperature range, and so forth. By the present invention, it has become possible to obtain the temperature detector whose operation is stable, accurate and highly sensitive. Furthermore, the detecting device of the present invention can provide highly reliable contactless switching operation. These unique features cannot be expected from the known type of temperature detecting devices.

It is therefore the principal object of the present invention to provide a temperature detecting device having extremely accurate operation, less malfunction, and extremely high sensitivity with respect to fine variation in temperature.

The specific nature, principle, and details of the invention will be more clearly apparent by reference to the following description, taken in conjunction with the accompanying drawings in which.

Figure 1:
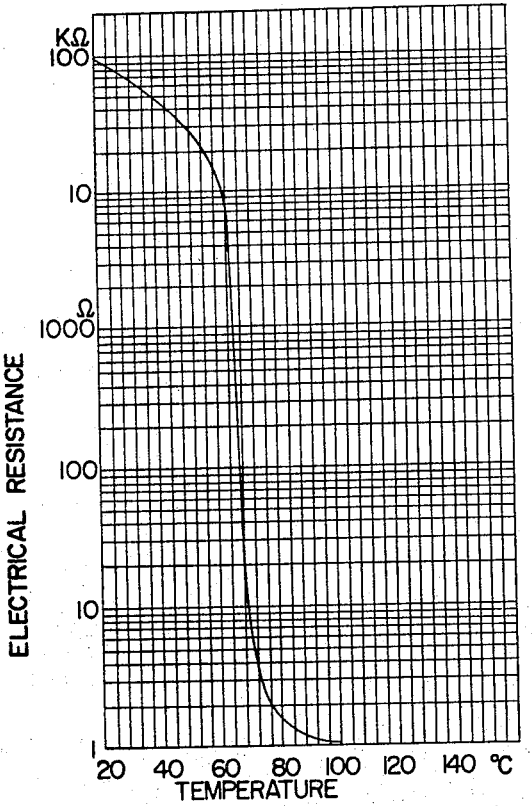
FIG. 1 is a graphical representation indicating the relationship between temperature and electrical resistance of a critical temperature resistor.

Referring to FIG. 1 which shows one example of resistance-temperature characteristics of a critical temperature resistor which has the composition of material: V of 7.1 parts, P of 1.1 parts, and Sr of 1.8 parts in gramatoms (the composition may be indicated as V 7.1, P 1.1, Sr 1.8), or $V_2O_5$ of 60 mol percent, $P_2O_5$ of 10 mol percent and SrO of 30 mol percent, it is seen that the resistance value of the resistor abruptly decreases by $\frac{1}{3000}$ from 15 kilo-ohm to 5 ohm within the temperature range of 60–70° C. and that the variation in the resistance value in response to the temperature variation is small below 60° C. and above 70° C.

Figure 2:
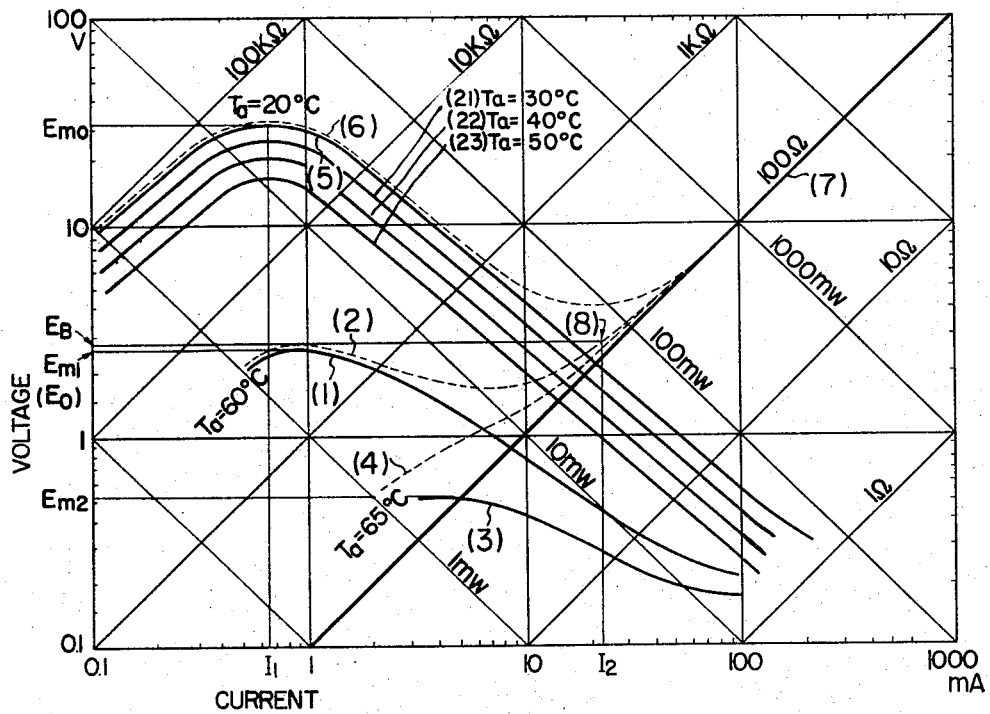
FIG. 2 is a graphical representation indicating current-voltage characteristics of a critical temperature resistor.

Referring to FIG. 2, which shows one example of current-voltage characteristic curves of said critical temperature resistor, which has the composition of V 7.1, P 1.1, Sr 1.8, curves 5, 21, 22, 23, 1 and 3 are those respectively corresponding to surrounding temperature $T_a$ of 20, 30, 40, 50, 60, 65 degrees C.

These curves have a point at which the voltage attains a maximum, and the voltage peak values in curves 5, 1 and 3, respectively are shown as $E_{m0}$, $E_{m1}$ and $E_{m2}$. The variation in this voltage peak value in response to the temperature variation is larger in comparison with that in the conventional thermistors. FIG. 2 shows the voltage peak values at the ambient temperatures $T_a$ of 20° C., 30° C., 40° C., 50° C., 60° C. and 65° C. as 30 v., 24 v., 19 v., 13 v., 2.5 v. and 0.5 v., respectively. In particular, it can be clearly seen from the drawing that the voltage peak value considerably decreases at a temperature of about 60° C. Namely, while the gap of the voltage peak values between $T_a=20°$ C. and $T_a=30°$ C. is about 6 v., the gap of the voltage peak values between $T_a=50°$ C. and $T_a=60°$ C. is about 10.5 v. In this invention, the voltage peak at the ambient temperature of 60° C. is an important point for detecting the ambient temperatures of 60° C.

When a resistance as indicated by 7 in FIG. 2 having a resistance value of 100 ohms is connected in series with the critical temperature resistor at these different temperature conditions, curves 6, 2 and 4 of FIG. 2 are obtained.

Figure 3:
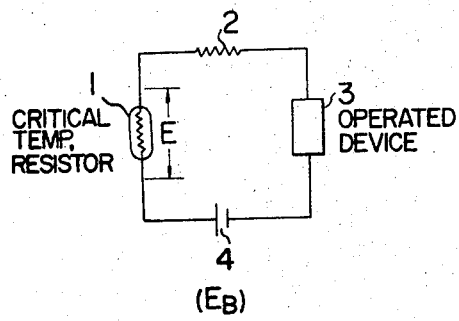
FIG. 3 is a circuit diagram indicating the principle of the invention.

The circuit shown in FIG. 3, indicating the principle of the temperature detector of the invention, consists of a series-connection of a critical temperature resistor 1, a series resistor 2, a device 3 such as an alarm or indicator, and a power source 4. The critical temperature resistor 1 is installed in an exposed state at a point where the surrounding temperature is to be detected so that resistance value will vary sensitively in response to the temperature and has a miniature size so that its time constant will be small. The components of the circuit other than the critical temperature resistor 1 may be installed at a point other than that where the temperature is to be detected.

The principle of operation of the circuit shown in FIG. 3 will now be considered. First, at the normal ambient temperature, a voltage which is lower than the voltage peak value $E_m$ of the current-voltage characteristic curve of the critical temperature resistor 1 is impressed on the said resistor 1.

When, for example, a critical temperature resistor 1 having characteristics as shown in FIG. 2 is used at an ambient temperature $T_a$ of 20° C., the voltage peak value $E_m$ will be $E_{m0}=30$ v. Therefore, the power source 4 is selected in such a manner that the voltage E to be impressed on resistor 1 becomes less than 30 v. at $E_{m0}$. When it is intended to operate the detector at the ambient temperature of, for example, 60° C., the power source 4 is selected in such a manner that the voltage $E_0$ to be impressed on said resistor 1 at $T_a$ of 60° C. is equal to $E_{m1}$ (about 2.5 v.), since it is apparent from FIG. 2 that the voltage peak value $E_{m1}$ at $T_a=60°$ C. is 2.5 v.

At the normal ambient temperature (e.g. $T_a=20°$ C.), since the voltage peak value $E_{m0}$ is higher than the voltage E impressed on said critical temperature resistor 1 (the voltage E is nearly equal to said voltage $E_0$), the current thereby flowing in said resistor 1 is stabilized by being suppressed with a smaller value than that of the current $I_1$. In case the temperature of the resistor 1 is lower than 60° C., the resistance value of the critical temperature resistor 1 becomes more than 10 kilo ohms as shown in FIG. 1 which is far greater than the resistance value of 100 ohms obtained by summation of the internal resistances of the series-resistance 2 and the operated device 3 with the consequence that, in case of the ambient temperature being less than 60° C., the current flowing through the temperature detector is actually determined by the resistance value of the resistor 1. Accordingly, the required voltage value $E_B$ of the power source will be substantially equal to the abovementioned voltage $E_0$ (e.g. about 2.5 v. as shown in FIG. 2). (The voltage value $E_B$ is usually selected higher than the value of $E_0$ for the voltage decrease due to the resistance 100 ohms.)

As the surrounding temperature gradually rises, the resistance of the critical temperature resistor 1 decreases in response to this surrounding temperature, and in the current-voltage characteristic representation, the voltage peak value $E_m$ gradually becomes lower. When, at or over the ambient temperature $T_a$ of 60° C., the voltage peak value $E_m$ becomes equal to or lower than $E_0$ or $E_{m1}$, it immediately shifts to the stabilizing point 8 (the point being indicated by $E_B$ in $I_2$ in FIG. 2) with the consequence that a large current flows suddenly in the critical temperature resistor, assuming a value such as an $I_2$. The device 3, such as alarm or indicator, is thereby operated by this large current. The device 3 can be simply a means to detect variations in current flowing in this circuit, in which case a signal corresponding to variation of current which has been emitted and detected is transmitted to other device.

In this example, as the maximum (or peak) voltage value widely varies with respect to slight variation in temperature in the vicinity of $T_a=60°$ C., the current-voltage to be impressed on the resistor at $T_a=20°$ C. need not be adjusted exactly at 2.5 v. For example, even when a voltage having a range of 1.5 v.–3.5 v. is applied, the temperature to be finally detected will be $60\pm1°$ C., hence it is possible to detect with extreme accuracy the temperature of 60° C. which is primarily intended. Accordingly, the instant detector does not operate erroneously with variation to some extent in the applying voltage value of the voltage source, whereby it is possible to detect with high sensitivity and accuracy the intended definite temperature.

In the foregoing example, explanation has been made with respect to a case wherein the total resistance obtained by adding the internal resistances of the series-resistance 2 and the operated device 3 is 100 ohms ( as shown by curve 7 in FIG. 2). In case it is desired to obtain larger set operating current $I_2$, this total resistance can only be reduced within an allowable range of power loss due to the resistance 1. Further it is to be noted that the abovementioned series-resistance 2 is not always necessary, but it can be dispensed with when the internal resistance of the operated device is sufficiently large. In other words, desired operating current can be obtained by controlling the value of the resistance 2 alone. The temperature at which the instant temperature detector is intended to be operated can be adjusted by appropriate selection of the voltage $E_B$ of the power source 4. In case the operated device 3 is actuated by current, it is desirable to utilize a constant voltage source as the power source 4.

Figure 4:
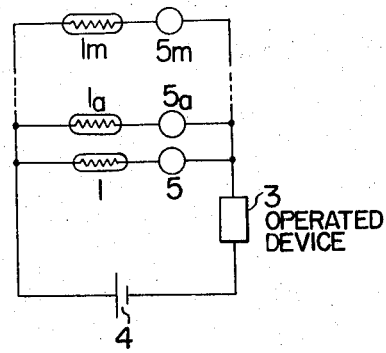
FIG. 4 is a circuit diagram showing a preferred embodiment of the temperature detector according to the invention.

In one embodiment of the temperature detector according to the invention as shown in FIG. 4, critical temperature resistors 1, 1a . . . 1m are connected in parallel with respect to an operated device 3, such as an alarm or an indicator, and a power source 4, connected in series with the device 3. In addition, pilot lamps 5, 5a . . . 5m are connected in series with the critical temperature resistors 1, 1a . . . 1m respectively, and serve to indicate clearly which of the critical temperature resistors distributively installed for temperature detection is operating, and at the same time, serve to verify temperature detection in a simple manner. These pilot lamps 5, 5a . . . 5m respectively correspond to the resistor 2 in FIG. 3.

When the conventional thermistor in which the resistance value varies almost exponentially with variation in temperature is utilized, it has been sufficient to use the one having large resistance-temperature coefficient for the purpose of constructing a detector having high sensitivity with respect to variation in temperature. However, in view of the fact that the resistance-temperature coefficient thereof at the normal temperature is as large as that in the vicinity of the operating temperature, there has been apprehension such that the device would commence operation before it attains the set operating temperature, hence the operation of the device is unstable. The temperature detector of the present invention is completely free from such disadvantage.

Figure 5:
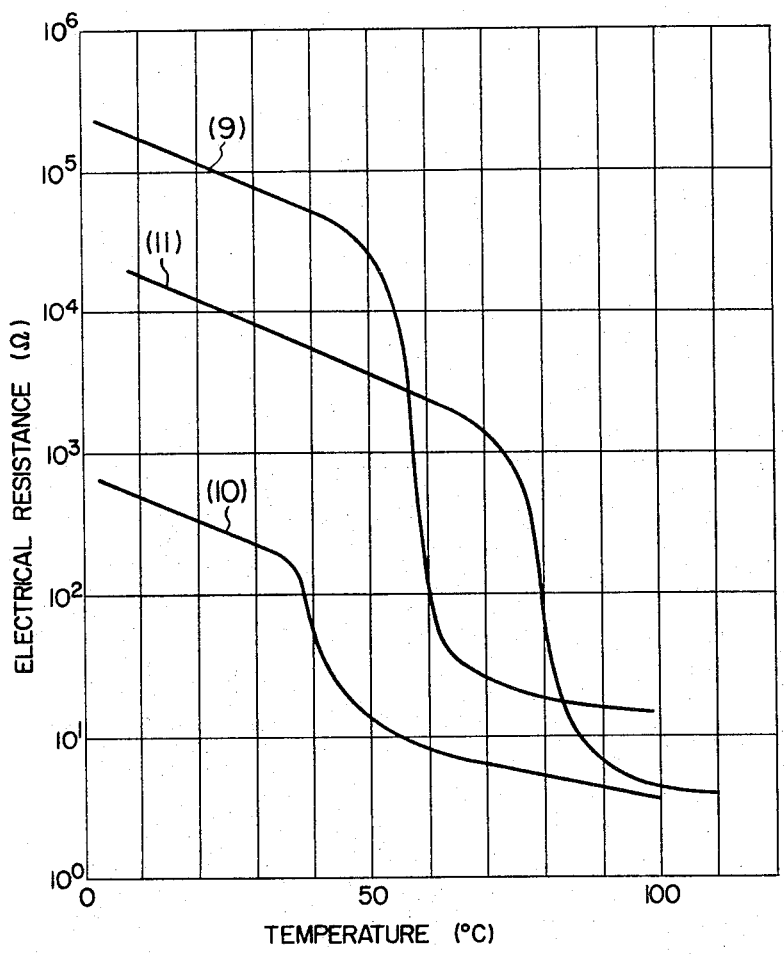
FIG. 5 is a graphical representation indicating the relationship between temperature and electrical resistance of other critical temperature resistors.

Other examples of the present invention will be explained hereinbelow with reference to FIGS. 5 through 8 inclusive. In FIG. 5, the curves 9, 10, and 11 respectively indicate the temperature-resistance characteristics of the critical temperature resistor whose material composition is respectively V 6-P 2-Fe 2, V 8.5-P 1.0-Mo 0.5, and V 8-Sr 1-G 1. In this graphical representation, the abscissa is temperature ( ° C.) indication which is graduated by natural number scale, and the ordinate is electrical resistance (ohm) indication which is graduated by logarithmic scale. The same graduation is applicable to FIGS. 6, 7, and 8.) As seen from this graph, the critical temperature resistor shown in terms of the characteristics curves 9, 10, and 11 possesses, unlike that as shown in FIG. 1, regions wherein the resistance value thereof abruptly decreases within the respective temperature ranges of 50–60° C., 35–45° C., and 70–90° C.

Figure 6:
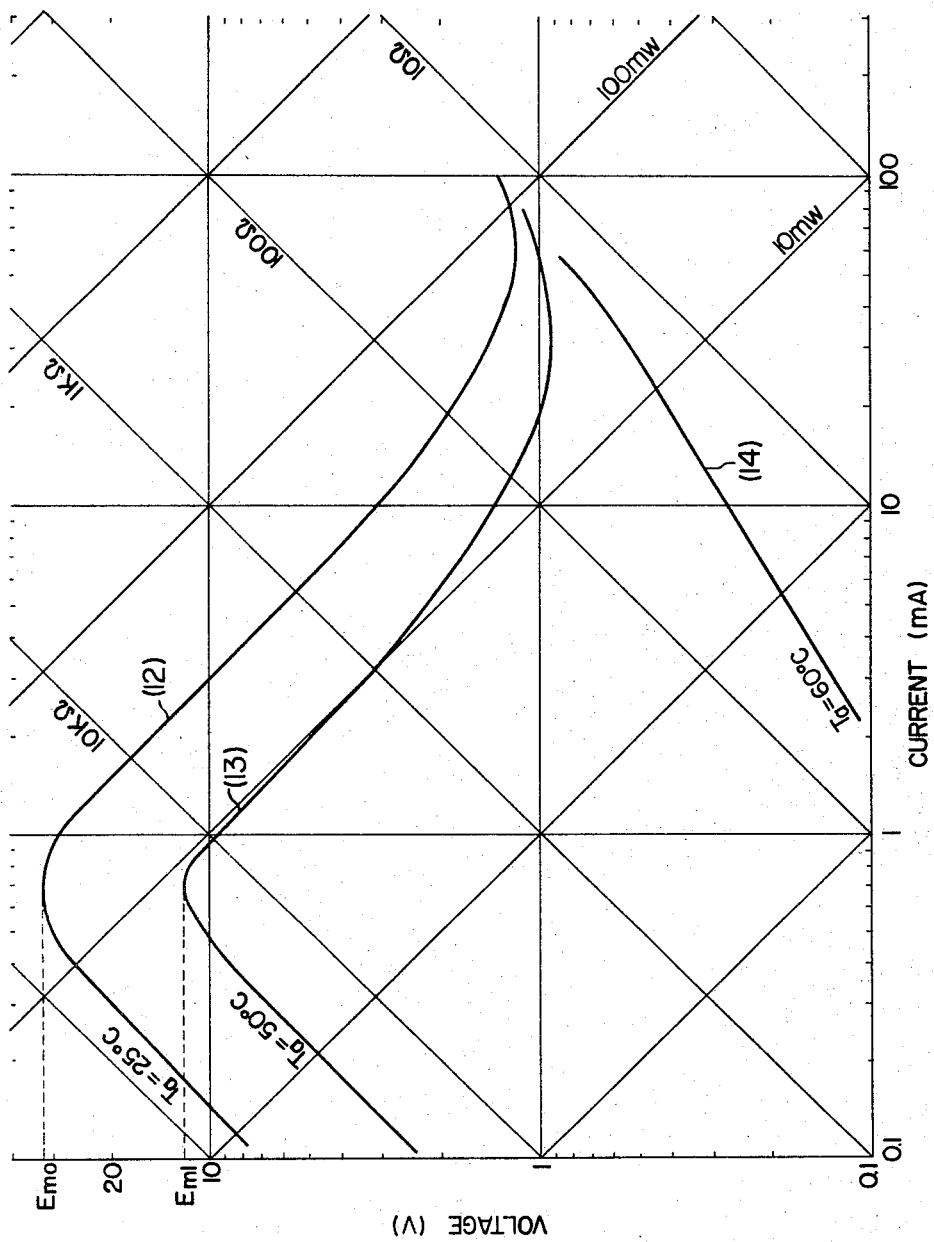
FIGS. 6, 7 and 8 are graphical representations indicating current-voltage characteristics of other critical temperature resistors.

The current-voltage characteristics of the critical temperature resistor having the composition of V 6-P 2-Fe 2 is shown in FIG. 6, from which it is seen that the curves 12, 13, and 14 respectively correspond to those at the ambient temperature of $T_a=25°$ C., $T_a=50°$ C., and $T_a=60°$ C. The circuit constructed with this critical temperature resistor will now be explained hereinbelow with reference to FIG. 3. In this example, the voltage value $E_B$ of the power source 4 is so selected that the voltage $E_0$ to be impressed on the resistor 1 will become equal to $E_{m1}$ when the ambient temperature $T_a$ reaches 50° C. on the ground that the resistance value of this resistor abruptly decreases at the temperature range of 50–60° C. From FIG. 6, the value of $E_{m1}$ is found to be 12 volts or so, the voltage value $E_B$ is so selected as to be equal to $E_0=12$ v. (Actually, the value $E_B$ is chosen slightly higher than the value of $E_0$. As for the resistance value, the resistor 2 and/or operated device 3 are so selected that the composite resistance of the internal resistance of the resistor 2 and the operated device 3 (more strictly, the composite resistance includes the internal resistance of the power source 4, too) becomes equal to, for instance, 100 ohms. In this way, a device for detecting that the ambient temperature of the resistor 1 has reached 50° C. can be obtained. In this device, when the ambient temperature of the resistor reaches or exceeds that specific temperature of 50° C., the operated device 3 commences operation.

Figure 7:
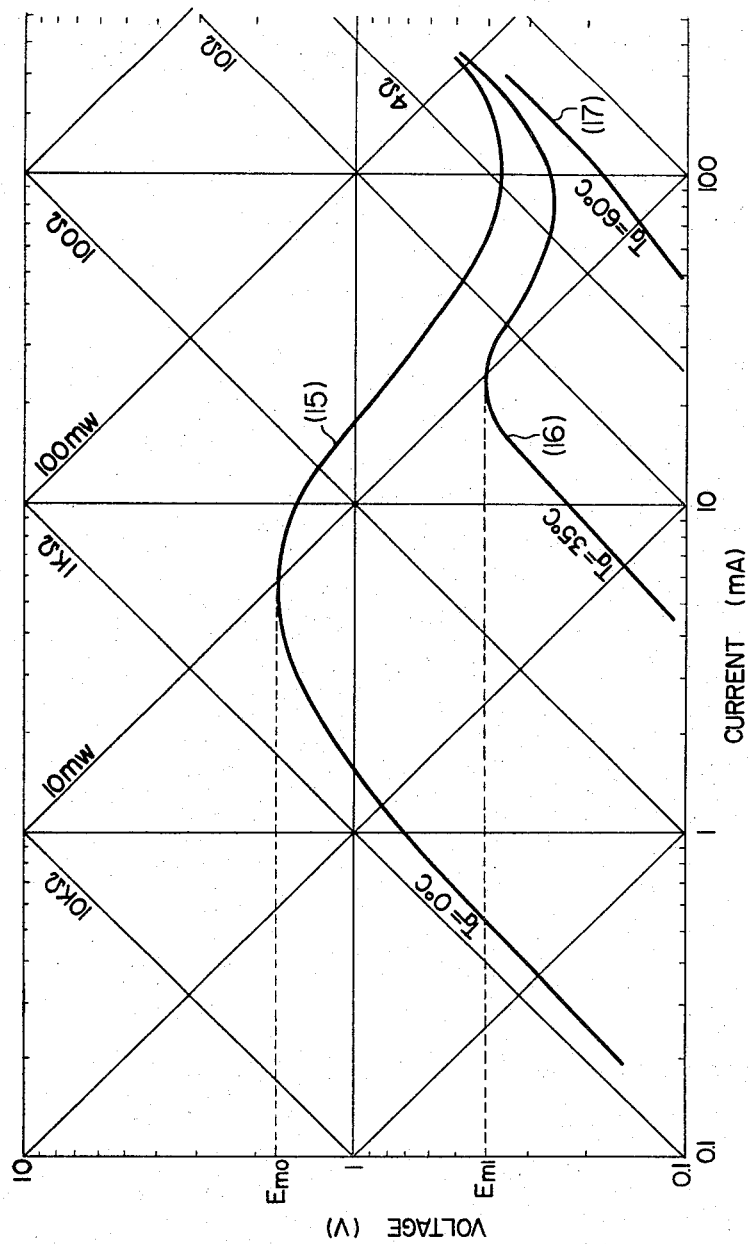

FIG. 7 indicates the current-voltage characteristics of the critical temperature resistor having the material composition of V 8.5-P 1.0-Mo 0.5, wherein the curves 15, 16 and 117 respectively correspond to those at the ambient temperature of $T_a=0°$ C., $T_a=35°$ C., and $T_a=60°$ C. In constructing the circuit shown in FIG. 3 by using this critical temperature resistor, the power source 4 is so selected that the value of $E_0$ becomes equal to $E_{m1}=0.4$ v. if and when the specific operating temperature is selected at $T_a=35°$ C. Furthermore, the resistance value of the resistance to be serially connected with the resistor 1 is selected at, for example, 4–10 ohms. In this case, the resistor 2 will probably be unnecessary and it is sufficient to select an element having small internal resistance as the operated device 3.

Figure 8:
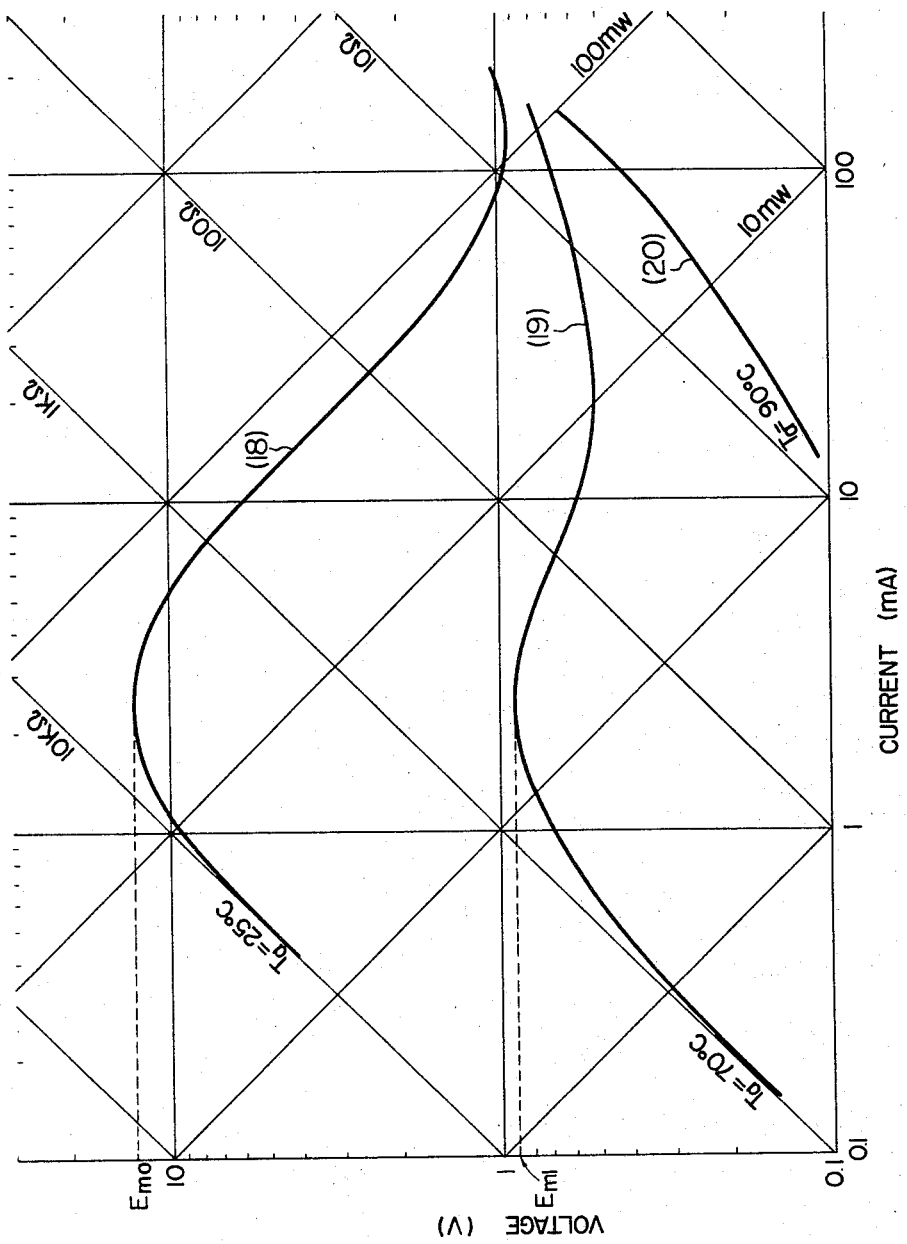

FIG. 8 shows the current-voltage characteristics of the critical temperature resistor having the material composition of V 8-Sr 1-Ge 1, wherein the curves 18, 19, and 20 respectively correspond to those at the ambient temperature of $T_a=25°$ C., $T_a=70°$ C., and $T_a=90°$ C. When this critical temperature resistor is used for constructing the circuit shown in FIG. 3, the power source 4 is so selected that the value of $E_0$ becomes equal to 0.9 v. since the value of $E_{m1}$ is 0.9 v. as seen from FIG. 8, and the resistance value to be serially connected with the resistor 1 is selected at, for example, 100–10 ohms. Thus, when the ambient temperature of the resistor 1 reaches or exceeds the temperature limit of 70° C., the operated device 3 commences operation to detect variation in temperature.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What I claim is:

1. A temperature detector for detecting rise in temperature above a definite temperature at least one point in space comprising at least one sensor composed of a critical temperature resistor containing oxide semiconductor which consists of sintered oxide member and fine grains of vanadium dioxide $VO_2$ crystal scattered in and surrounded by said oxide member, and which has, in the current-voltage characteristics thereof, a point at which the voltage attains a maximum value, said maximum voltage value decreasing as the ambient temperature rises; a power source means to apply to said critical temperature resistor in an ambient temperature lower than said definite temperature a voltage equal to or near the maximum voltage value which the critical temperature resistor has in said ambient temperature equal to said definite temperature; and means to detect abrupt increase in current flowing in of said critical temperature resistor when the ambient temperature of said sensor rises to a value not lower than said definite temperature.

2. The temperature detector according to claim 1, wherein said sintered oxide member comprises at least one oxide selected from the group consisting of oxides of phosphorus, silver, lithium, sodium, potassium, beryllium, magnesium, calcium, lanthanum, cerium, zirconium, zinc, cadmium, boron, aluminum, silicon, tin, bismuth, uranium and yttrium.

3. The temperature detector according to claim 1, wherein the amount of said vanadium dioxide $VO_2$ crystals contained in said sintered oxide member is at least 5 mol percent of said oxide semiconductor.

4. The temperature detector according to claim 1, wherein said fine grains of vanadium dioxide $VO_2$ crystal contain at least one kind of element selected from the group consisting of germanium, iron, cobalt, nickel, manganese, titanium, niobium, tungsten, molybdenum, tantalum and chromium.

5. The temperature detector according to claim 1, further comprising resistor means connected in series with said sensor.

6. The temperature detector according to claim 5, wherein said critical temperature resistor possesses an extremely large negative resistance-temperature coefficient within a specific temperature range just above said definite temperature and a small negative resistance-temperature coefficient just below said temperature range, and the resistance value of said serially connected resistor means is so determined that the total resistance value of the internal resistance of said power source means, the internal resistance of said detecting means, and a resistance value to be serially connected with said critical temperature resistor including the resistance of said resistor be smaller than the resistance value of said critical temperature resistor at a temperature lower than said temperature range, but larger than that at a temperature higher than said temperature range.

7. The temperature detector according to claim 1, wherein said power source means is a constant voltage source, and said detecting means is connected in series with said critical temperature resistor and power source and is actuated by abruptly increased current flowing in said circuit construction when the ambient temperature of said sensor becomes not smaller in value than the said definite temperature.

8. The temperature detector according to claim 1, wherein a plurality of said sensors are mutually connected in parallel.

9. The temperature detector according to claim 1, wherein said critical temperature resistor has a low resistance-temperature coefficient within the temperature range below said definite temperature, and an extremely large negative resistance-temperature coefficient to appear when the temperature exceeds said definite temperature.

10. A temperature detector for detecting rise in temperature above a definite temperature at least one point in space comprising at least one sensor composed of a critical temperature resistor containing oxide semiconductor which consists of sintered oxide member and fine grains of vanadium dioxide $VO_2$ crystal scattered in and surrounded by said oxide member, which has a low resistance-temperature coefficient within the temperature range below said definite temperature and an extremely large negative resistance-temperature coefficient to appear when the temperature exceeds said definite temperature, and which has, in the current-voltage characteristics thereof, a point at which the voltage attains a maximum value, said maximum voltage value decreasing as the ambient temperature rises; a resistance means; a power source means to apply to said critical temperature resistor in an ambient temperature a voltage equal to or near the maximum voltage value which the critical temperature resistor has in an ambient temperature equal to said definite temperature; means operated by the current flowing through said sensor when the ambient temperature of said sensor rises to a value not lower than said definite temperature; and means to connect in series said sensor, said resistance means, said power source, and said operated means.

11. The temperature detector according to claim 10, wherein said oxide member comprises an oxide of vanadium and an oxide of at least one metal selected from the group consisting of phosphorus, silver, lithium, sodium, potassium, beryllium, magnesium, calcium, lanthanum, cerium, zirconium, zinc, cadmium, boron, aluminum, silicon, tin, bismuth, uranium and yttrium, the amount of said fine grains of vanadium dioxide crystal being at least 5 mol percent of said oxide semiconductor, and said definite temperature being in the vicinity of 60° C.

12. The temperature detector according to claim 10, wherein said fine grains of vanadium dioxide crystal contain in the state of solid-solution a small amount of at least one metal selected from group consisting of germanium and titanium, and said definite temperature is above 60° C.

13. The temperature detector according to claim 10, wherein said fine grains of vanadium dioxide crystal contains in the state of solid-solution a small amount of at least one metal selected from the group consisting of iron, cobalt, nickel, manganese, niobium, tungsten, molybdenum, tantalum and chromium, and said definite temperature is below 60° C.

14. A temperature detector for detecting an ambient temperature above 60° C. comprising: a critical temperature resistor containing V 71%, P 11%, and Sr 18% in gram atomic weight; a voltage source for supplying a voltage of about 2.5 volts to said critical temperature resistor at an ambient temperature below 60° C., means for raising the ambient temperature above 60° C.; and detecting means to detect increase in a current flowing in said critical temperature resistor.

15. A temperature detector for detecting an ambient temperatsre above 50° C. comprising: a critical temperature resistor containing V 60%, P 20%, and Fe 20% in gram atomic weight; a voltage supplying means for supplying a voltage of about 12 volts to said critical temperature resistor at an ambient temperature below 50° C.; means for raising the ambient temperature above 50° C.; and detecting means to detect an increase in a current flowing in said critical temperature resistor.

16. A temperature detector for detecting an ambient temperature 35° C. comprising: a critical temperature resistor containing V 85%, P 10%, and Mo 5% in gram atomic weight; a voltage supplying means for supplying a voltage of about 0.4 volt to said critical temperature resistor at an ambient temperature below 35° C.; and detecting means to detect an increase of current flowing in said critical temperature resistor.

17. A temperature detector for detecting an ambient temperature above 70° C. comprising: a critical temperature resistor containing V 80%, Sr 10%, and Ge 10% in gram atomic weight; a voltage supplying means for supplying a voltage of about 0.9 volt to said critical temperature resistor at an ambient temperature below 70° C.; means for raising the ambient temperature above 70° C.; and detecting means to detect an increase of current flowing in said critical temperature resistor.

References Cited

UNITED STATES PATENTS

| | | | |
|---|---|---|---|
| 2,977,558 | 3/1961 | Hampton | 338—22 |
| 3,149,298 | 9/1964 | Handelman | 338—22 |
| 3,199,087 | 8/1965 | Foglia | 340—173 |
| 3,226,600 | 12/1965 | Zielasek | 315—209 |

OTHER REFERENCES

IBC technical disclosure bulletin, "Temperature Detector," A. J. Meyers, vol. 4, No. 3, p. 71, August 1961.

JOHN W. CALDWELL, *Pimary Examiner.*

DONALD J. YUSKO, *Assistant Examiner.*